Patented Aug. 4, 1931

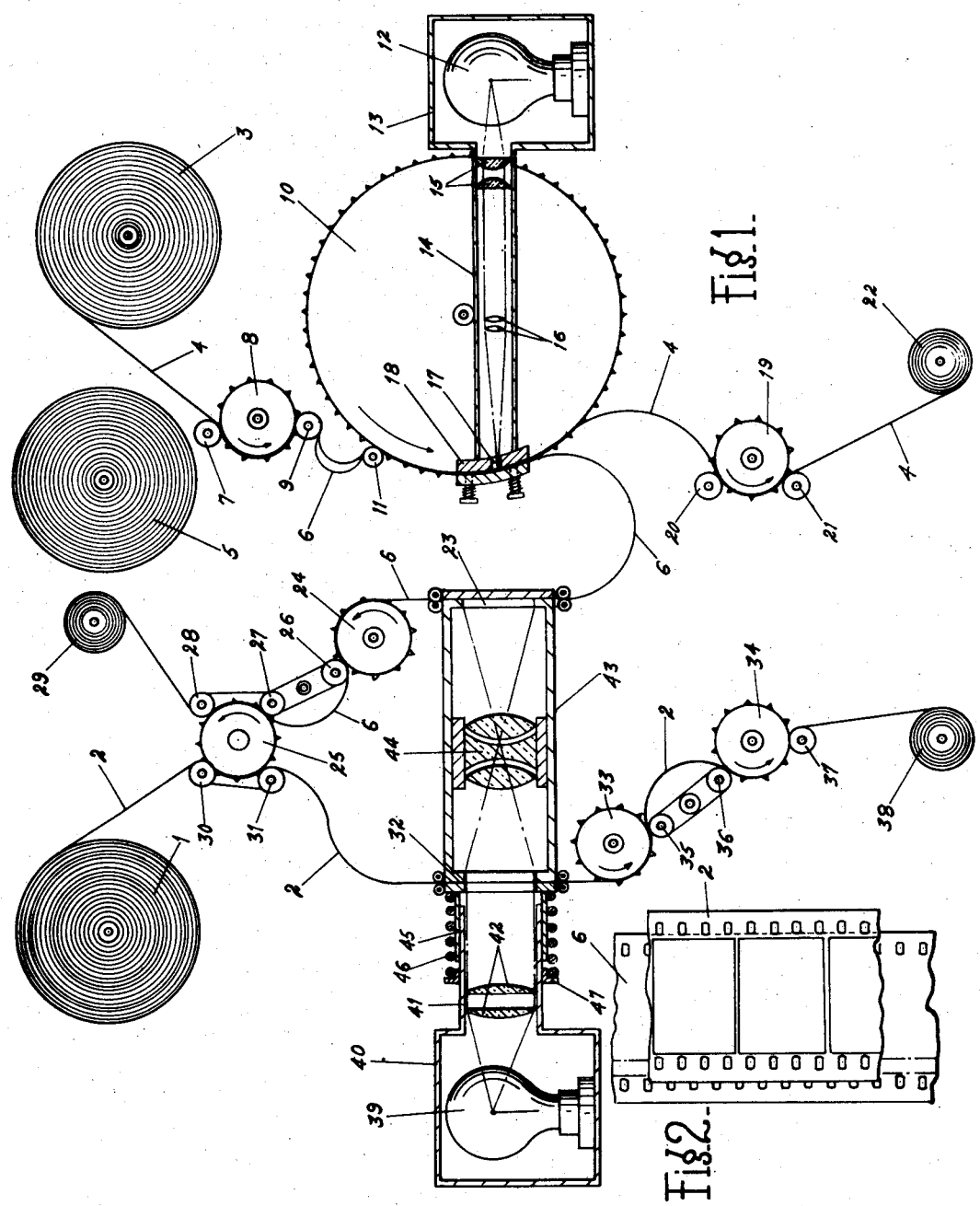

1,817,320

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

MOTION PICTURE PRINTING APPARATUS

Application filed November 26, 1929. Serial No. 409,864.

This invention relates to improvements in motion picture printing apparatus, the principal object of the invention being to provide an apparatus in which motion picture images carried by a negative film and a photographic sound record carried by a separate negative film may readily be printed upon a a single positive film for synchronous reproduction.

In the motion picture art it is sometimes desirable to add to a motion picture which has already been photographed an appropriate sound record thereby to produce what is known as a talking picture by utilizing a picture which was originally a silent one. The object of the present invention, therefore, is to provide an apparatus in which such a composite record of sound and picture images can be readily produced.

Other objects and advantages will appear as the description proceeds.

In the drawings accompanying this specification,

Figure 1 is a diagrammatic, partly sectional side view of an apparatus embodying the features of the present invention; and Figure 2 is a fragmentary plan view illustrating one method of displacing the picture images on the positive film in order to provide room for the sound record.

Referring to the drawings, 1 designates a film supply reel carrying a negative picture film 2. A second film supply reel 3 carries a negative sound record film 4, and a third supply reel 5 carries a positive film 6 on which the picture images carried by the film 2 and the sound record carried by film 4 are to be printed.

The positive film 6 is fed from its supply reel 5 over an idler guide roller 7, a sprocket 8, guide roller 9 to a sprocket 10 and guide roller 11, the film being maintained in looped condition between the sprockets 8 and 10. The negative sound record film 4 is fed from its supply reel 3 between the rollers 7 and 9 and the sprocket 8 and between the roller 11 and sprocket 10, along with the positive film 6, said negative and positive films being in contact with each other as they pass over said sprockets. Means are provided for printing the sound record from the negative film to the positive at a point in their passage over the sprocket 10 when they are in closest contact, which means comprises a printing lamp 12 enclosed within a housing 13 having a tubular extension 14 in which are mounted a condenser lens 15 and a focusing lens 16, whereby the rays of the lamp are concentrated by the condenser lens upon said focusing lens 16, which in turn focuses said rays through an opening 17 in a gate 18 through which the two contacting films pass during their engagement with the sprocket 10. After their passage past the printing station 17, the film 4 is led in loop formation to a sprocket 19 with which it is maintained in proper engagement by guide rollers 20 and 21. After passing between the guide roller 21 and sprocket 19, the negative film 4 passes to its takeup reel 22. The positive film 6 is looped away from the sprocket 10 and film 4 and passes through a gate 23 forming the printing station of the picture printing device hereinafter described. After its passage through said gate the film 6 is engaged by a sprocket 24 from whence it passes to a sprocket 25, the film being maintained in loop form between the sprockets 24 and 25 by means of a pair of rollers 26 and 27, which serve to retain the film in engagement with the respective sprockets 24 and 25. The film 6 then passes between the sprocket 25 and a guide roller 28 to its takeup reel 29.

The negative picture film 2 passes from its supply reel 1 to the sprocket 25 and is held in engagement with said sprocket by means of guide rollers 30 and 31. The film 2 is thus engaged by the sprocket at that side thereof diametrically opposite from the film 6 so that when the sprocket 25 is rotated the films 2 and 6 will move in opposite directions. The film 2 is fed by the sprocket 25 to a gate 32 forming a part of the picture printing device described hereinafter, and is pulled through said gate by a sprocket 33, from whence it passes to a sprocket 34. A pair of guide rollers 35 and 36 serve to retain the film in loop formation between the sprockets 33 and 34. From the latter sprocket the film passes over a guide roller 37 and thence to its takeup reel 38.

The picture printing apparatus comprises a printing lamp 39 enclosed within a housing 40 having a tubular extension 41 in which is mounted a condenser lens 42. The gates 23 and 32 hereinbefore referred to are disposed at opposite ends of a tubular housing 43 in which is mounted a lens 44, said housing being disposed in alignment with the extension 41 in which is housed condenser lens 42, whereby light rays from the lamp 39 will be concentrated by said condenser lens upon the lens 44 through the usual opening in the gate 32, and the lens in turn will project said rays upon the positive film 6 as it passes through gate 23. The tubular extension 41 is provided with a telescoping portion 45 around which is mounted a coil spring 46, one end of said spring abutting against a radial flange 47 carried by the extension 41 and the opposite end against a flange at the end of the telescoping portion 45 and forming a part of the film gate 32 whereby the telescoping portion will be maintained in proper gate forming position under the tension of said spring.

In the apparatus above described, the rotation of the sprockets 24 and 33 may be intermittent, for which reason the means herein described for retaining the films in loop form between sprockets is provided so as to avoid undue strain on the film when being pulled by one sprocket from another. Any suitable means may be provided for imparting motion to the sprockets for actuating them synchronously.

In order to provide room on the positive film for both the picture images and sound record, provision may be made for printing the picture images slightly off center longitudinally with relation to the positive film. This may be done by placing the gate 23 somewhat out of alignment with the gate 32, whereby the films 2 and 6 will have the relative lateral positions indicated in Figure 2, and if necessary the lens 44 may be adjusted so as slightly to reduce the size of the picture images, thus preventing encroachment of said picture images on that portion of the positive film along the edge thereof where the sound record has been printed. On the other hand, the gates 23 and 32 may be disposed in alignment and a suitable mask provided for covering the sound record portion of the positive film during the printing of the picture images thereon.

I claim:

A photographic printing apparatus, comprising in combination, a pair of light projecting systems having their longitudinal axes in substantial alignment, means for conducting a positive film and a film bearing a negative photographic record in contact with each other across the path of projection of one of said systems in one direction thereby to transfer the record carried by said negative to a portion of the width of said positive film, means for conducting the positive film away from said negative and across the path of projection of the other system in the opposite direction, and means for conducting a second film bearing a negative photographic record across said last path of projection between said positive film and the light source of the system thereby to transfer the record carried by said negative to a portion of said positive in contiguous relation to the record first transferred thereto.

In testimony whereof I affix my signature.

FREEMAN H. OWENS.